(12) United States Patent
Oishi

(10) Patent No.: US 6,385,318 B1
(45) Date of Patent: *May 7, 2002

(54) ENCRYPTING METHOD, DECIPHERING METHOD AND CERTIFYING METHOD

(75) Inventor: Kazuomi Oishi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/837,387

(22) Filed: Apr. 17, 1997

(30) Foreign Application Priority Data

Apr. 19, 1996 (JP) .............................. 8-098668

(51) Int. Cl.$^7$ ................................ H04L 9/00
(52) U.S. Cl. ................... 380/262; 380/285; 380/30; 713/185
(58) Field of Search .............. 380/23, 30, 44, 380/259, 260, 262, 282, 285, 28; 713/185

(56) References Cited

U.S. PATENT DOCUMENTS

| 4,972,476 A | * 11/1990 | Nathans ........................ 380/23 |
| 4,993,068 A | * 2/1991 | Piosenka et al. .............. 380/23 |
| 5,131,038 A | * 7/1992 | Puhl et al. .................... 380/23 |
| 5,208,858 A | * 5/1993 | Vollert et al. ................. 380/43 |
| 5,280,527 A | * 1/1994 | Gullman et al. .............. 380/23 |
| 5,341,428 A | * 8/1994 | Schatz ........................ 380/23 |
| 5,436,972 A | * 7/1995 | Fischer ........................ 380/25 |
| 5,457,747 A | * 10/1995 | Drexler et al. ................ 380/24 |
| 5,469,506 A | * 11/1995 | Berson et al. ................ 380/23 |
| 5,659,616 A | * 8/1997 | Sudia .......................... 380/23 |
| 5,850,442 A | * 12/1998 | Muftic ......................... 380/21 |

FOREIGN PATENT DOCUMENTS

| DE | 42 43 908 A1 | 6/1994 |
| EP | 334616 A | 9/1989 |
| WO | WO 96 08093 A | 3/1996 |

OTHER PUBLICATIONS

Schneier, Bruce; Applied Cryptography, 2nd Edition. Published by John Wiley & Sons, Inc. pp. 1–5, Oct. 1995.*
Patent Abstracts of Japan, vol. 012, No. 125 (P–691), Apr. 19, 1988 & JP 52 249276 A (Hitachi LTD), Oct. 30, 1987.

* cited by examiner

Primary Examiner—Albert Decady
Assistant Examiner—Paul E. Callahan
(74) Attorney, Agent, or Firm—Fitzpatrick, Cella, Harper & Scinto

(57) ABSTRACT

Predetermined information, correlated with the attribute information of an entity, is used as the secret key for encrypting in the public key cipher system or as the secret key for deciphering the enciphered information, thereby enabling to certify the adequacy of the encrypting or deciphering entity at the destination or source of communication. Also predetermined information, correlated with the attribute information of an entity, is used as the public key for encrypting in the public key cipher system or as the public key for deciphering the encrypted information, thereby enabling to certify the adequacy of the entity at the destination or source of communication, at the encrypting or deciphering side.

28 Claims, 2 Drawing Sheets

ENCRYPTING METHOD, DECIPHERING METHOD AND CERTIFYING METHOD

BACKGROUND OF THE INVENTION

1. Field of the Invention

The present invention relates to an encrypting method, a deciphering method and a certifying method, and more particularly to an encrypting method, a deciphering method and a certifying method adapted for use in various information services.

2. Related Background Art

Ciphers can be generally classified into (A) common ciphers and (B) public key ciphers.

The common cipher (A) employs one and the same key secretly owned by the transmitter and the receiver, and is also called a common key cipher or a secret key cipher.

In the public key cipher (B), the enciphering key and the deciphering key are mutually different, and the encrypting key is made publicly open while the deciphering key is held secret. In the following there will be given an explanation of the public key cipher, with respect to (a) features, (b) protocol, (c) a representative example, and (d) the RSA cipher as a specific example thereof.

(a) Features of the Public Key Cipher

1. Since the encrypting key and the deciphering key are different and the encrypting key can be made public, it is not necessary to deliver the encrypting key in secret, and thus the key delivery is made easier.

2. Since the encrypting key of each user is made public, each user is only required to maintain the deciphering key secret.

3. There can be realized a certifying function allowing the receiver to confirm that the transmitter of the transmitted message is not false and that the transmitted message has not been tampered with.

(b) Protocol of the Public Key Cipher

For a message M to be communicated, with a public encrypting key $k^P$ (hereinafter called public key) for defining an encrypting operation $E(k^P, M)$ and a secret deciphering key $k^S$ for defining a deciphering operation $D(k^S, M)$, the public key cipher algorithm in the first place satisfies the following two conditions:

(1) If the public key $k^P$ is known, the encrypting operation $E(k^P, M)$ can be easily calculated. Also if the secret key $k^S$ is known, the deciphering operation $D(k^S, M)$ can be easily calculated.

(2) In a case where the secret key $k^S$ is not known, even if the above-mentioned public key $k^P$ and the calculating procedure $C=E(k^P, M)$ for the above-mentioned enciphering operation E are known, the determination of the message M is difficult in consideration of the amount of calculation.

The secret communication can be realized by satisfying the following condition (3), in addition to the foregoing conditions (1) and (2):

(3) The encrypting operation $E(k^P, M)$ can be defined for all the messages (plain texts) M, and there stands a relation:

$$D(k^S, E(k^P, M))=M$$

Thus, since the $k^P$ is made public, anybody can execute the calculation of the encrypting operation $E(k^P, M)$, but the restoration of the message M through the deciphering operation $D(k^S, E(k^P, M))$ can only be made by the person who has the secret key $k^S$. On the other hand, the certified communication can be realized by satisfying the following condition (4), in addition to the foregoing conditions (1) and (2):

(4) $D(k^S, M)$ can be defined for all the messages (plain texts) M, and there stands a relation:

$$E(k^P, D(k^S, M))=M$$

The deciphering operation $D(k^S, M)$ can be calculated only by the proper holder of the secret key $k^S$, and, even if another person pretends to be such proper holder of the secret key $k^S$ by calculating $D(k^{S'}, M)$ with a false secret key $k^{S'}$, the receiver can confirm that the received information is false since $E(k^P, D(k^{S'}, M)) \neq M$. Also if $D(k^S, M)$ is tampered with, there results $E(k^P, D(k^S, M)') \neq M$, so that the receiver can confirm that the received information is improper.

In the following there will be shown the protocols of secret communication, certified communication and secret communication with signature from a transmitter A to a receiver B by the public key cipher, wherein the transmitter A is assumed to have a secret key $k^S_A$ and a public key $k^P_A$, and the receiver B is assumed to have a secret key $k^S_B$ and a public key $k^P_B$.

Secret Communication

The secret communication of a message (plain text) M from the transmitter A to the receiver B is executed in the following procedure.

At first, in a step 1, the transmitter A encrypts the message M with the public key $k^P_B$ of the receiver B and sends the cipher text C to the receiver B, wherein:

$$C=E(k^P_B, M).$$

Then, in a step 2, the receiver B deciphers the received cipher text C with his own secret key $k^S_B$ to obtain the original plain text M by:

$$M=D(k^S_P, C).$$

Since the public key $k^P_B$ of the receiver B is made public to unspecified plural persons, the secret communication to the receiver B can be made not only by the transmitter A but also by any other person.

Certified Communication

The certified communication of a message (plain text) M from the transmitter A to the receiver B is executed in the following procedure.

At first, in a step 1, the transmitter A generates a transmission text S with his secret key $k^S_A$ of the receiver A and sends it to the receiver B, wherein:

$$S=D(k^S_A, M).$$

The transmission text S mentioned above is called a signature text, and the operation of obtaining such signature text S is called signing.

Then, in a step 2, the receiver B executes the restoring conversion of the signature text S with the public key $k^P_A$ of the transmitter A, thereby obtaining the original plain text M by:

$$M=E(k^P_A, S)$$

By the confirmation that the restored plain text M mentioned above constitutes a meaningful message, it is certified that the above-mentioned plain text M has certainly been transmitted from the transmitter A.

Since the public key of the transmitter A is made public to the unspecified plural persons, the signature text of the transmitter A can be certified not only by the receiver B but also any other person. Such certification is called digital signature.

Signed Secret Communication

The signed secret communication of a message (plain text) M from the transmitter A to the receiver B is executed in the following procedure.

At first, in a step 1, the transmitter A prepares a signed text S by signing the message M with the secret key $k^S_A$ of the transmitter A, wherein:

$$S=D(k^S_A, M).$$

Then the transmitter A encrypts the signed text S with the public key $k^P_B$ of the receiver B and sends the cipher text C to the receiver B, where:

$$C=E(k^P_B, S).$$

Then, in a step 2, the receiver B deciphers the cipher text C with the secret key $k^S_B$ of the receiver B to obtain the signed text S by:

$$S=D(k^S_B, C).$$

Also the receiver B executes the restoring conversion of the signed text S with the public key $k^P_A$ of the transmitter A, thereby obtaining the original plain text M by:

$$M=E(k^P_A, S).$$

By the confirmation that the restored plain text M mentioned above constitutes a meaningful message, it is certified that the above-mentioned plain text M has certainly been transmitted from the transmitter A.

The order of applications of the functions in the foregoing steps of the signed secret communication may also be inverted. More specifically, in addition to the above-mentioned procedure:

$$C=E(k^P_B, D(k^S_A, M)) \qquad \text{Step 1}$$

$$M=E(k^P, D(k^S_B, C)) \qquad \text{Step 2}$$

the signed secret communication can also be realized by the following procedure:

$$C=D(k^S_A, E(k^P_B, M)) \qquad \text{Step 1}$$

$$M=D(k^S_B, E(k^P_A, C)) \qquad \text{Step 2}$$

(c) Specific Example of Public Key Cipher

As it is difficult to explain the individual cipher systems, in the following there will be explained the RSA cipher system as a specific example. The RSA cipher was invented by Rivest, Shamir and Adleman of MIT and was named after them.

The RSA cipher is presently one of the most promising public key ciphers. In the following, there will be explained the basic principle of the RSA cipher, in the order (1) key generation, (2) encrypting and (3) deciphering.

(1) Key Generation

The public key and the secret key are determined by the following algorithm.

1. Mutually different large prime numbers p, q are arbitrarily selected and the product n thereof is calculated by:

$$n=pq$$

2. The least common multiple L of (p−1) and (q−1) is calculated, and there is selected an arbitrary integer e, which is relatively prime to thus calculated least common multiple L and is smaller than the least common multiple by:

$$L=LCM((p-1), (q-1))$$

$$GCD(e, L)=1$$

$$1<e<L$$

where LCM indicates the least common multiple and GCD indicates the greatest common divisor.

3. The following congruence equation is solved, based on the arbitrary integer e and the least common multiple L determined in the foregoing step 2:

$$ed \equiv 1 (\bmod L)$$

The values (e, n) thus determined are used as the encrypting key while those (d, n) are used as the deciphering key, in which e and n are the public keys while d is the secret key.

(2) Encrypting

For a plain text M and a cipher text C, the encrypting algorithm E is represented by:

$$C=E(M)=M^e \bmod n$$

where each of the plain text M and the cipher text C is an integer between 0 and n−1. If the original message is larger than the integer n, it is divided into blocks of a size n and the encrypting or the deciphering process is applied in succession to such blocks.

(3) Deciphering

The deciphering algorithm D is represented by:

$$M=D(C)=C^d \bmod n$$

In the case of deciphering the plain text M encrypted by the above-mentioned encrypting algorithm $E(M)=M^e \bmod n$:

$$D(C)=D(E(M))\equiv(M^e)^d\equiv M^{ed}\equiv M (\bmod n)$$

so that the original plain text M can be obtained.

Based on the above-explained principle, the public key can be disclosed for example in a telephone directory, and it is no longer necessary to maintain a key individually with each of the unspecified plural persons. Therefore, in contrast to the secret key cipher system, in which a key has to be secretly shared by the partners of communication prior to the execution of the communication, the public key cipher system has an advantage that the management and use of the keys are easier.

However, most public key cipher systems are unable, because of the structural limitations thereof, to select arbitrary public keys, so that the public key has merely been a number which is meaningless to the persons concerned.

On the other hand, a serious problem will arise unless the proper correlation is maintained between the key and the corresponding entity (entity of communication which is the user or the computer).

More specifically there will result a situation where a document intended for a person A is erroneously delivered to a person B, or a situation of "pretense" where a signature intended to be obtained from a person A is obtained from another person B.

However, as long as the public key is a number meaningless to the involved persons, the correlation between an entity and its public key cannot be verified directly by other arbitrary entities, so that the keys have to be managed by a key list to be publicized by a reliable organization.

On the other hand, a cipher system and signature method based on ID, capable of employing an ID (personalized identification information such as name or address) as the public key, have been proposed for example by, A. Shamir, "Identity-Based Cryptosystems and Signature Schemes", Proc. of Crypt. '84, 1984 and by T. Okamoto and A. Shiraishi, "Safe User Verifying Method by Single Management Information", IN83-92, 1984.

Such systems, having a structure allowing the use of the ID of the entity as the public key, allows the user to understand the public key as the ID information. Since the correctness of the public key can be understood in an easier manner in comparison with other public key cipher systems, signature schemes, secret key cipher systems or identification systems, the list of keys can be dispensed with.

As an example of the ID-based cipher systems mentioned above, there will be explained, in the following, the system proposed by S. Tsujii, T. Ito and K. Kurosawa, "ID-Based Cryptosystems Using Discrete Logarithm Problem" Elect. Lett., Vol. 23, No. 24, 1988.

Preparation

At first, in a step 1, the center publicizes n-dimensional vectors:

$$a=(a_1, a_2, \ldots, a_n)$$

$$h=(h_1, h_2, \ldots, h_n)$$

$$h_1=g^{a_l} \bmod p \ (1<l<n)$$

based on a prime number p, an original element g of a Galois field GF(p) and a Galois field GF(p), and a one-dimensional function f.

Then, in a step 2, an entity i registers its ID:

$$ID_i=(x_{i1}, x_{i2}, \ldots, x_{ik})$$

$$(k<n), x_{i1} \in \{0, 1\} \ (i \leq 1 \leq k)$$

at the center.

Then, in a step 3, the center determines a modified ID:

$$EID_i \triangleq f(ID_i)=(y_{i1}, y_{i2}, \ldots y_{in}) \quad (1)$$

$$y_{i1} \in \{0, 1\} \ (i \leq 1 \leq n)$$

and calculates a secret key Si of the entity i:

$$S_i \equiv \sum_{1 \leq j \leq n} a_j y_{ij} \bmod p$$

$$\equiv EID_i \cdot a \bmod p$$

and sends it to the entity i through a safe communication path.

Encrypting

The transmitting entity j at first determines an arbitrary integer k, which is a secret of the transmitter only. Then it enters the ID of the receiving entity i into the encrypting apparatus, which generates $EID_i$ according to the foregoing function (1) and calculates the product $Z_i$ of the elements $h_1$, for which the corresponding $y_{i1}$ is 1, among the elements h, namely:

$$Z_i \triangleq \prod_{l=1}^{N} h_l^{y_{il}} \bmod p$$

$z_i$ can in fact be represented by:

$$Z_i \equiv \sum_{g^l=1}^{N} a_l y_{il} \equiv g^{S_i} \bmod p$$

The transmitting entity j prepares a cipher text:

$$C \equiv (g^k, MZ_i^k) \bmod p$$

from a plain text M according to the El Gamal cipher system, and sends the cipher text to the receiving entity i.

Deciphering

The receiving entity i calculates the $S_i$-th power of the first term $g^k$ of the received cipher text C to obtain:

$$(g^k)^{S_i} \equiv (g^{S_i})^k \equiv Z_i^k \bmod p$$

and divides the second term with $Z_i^k$ to obtain the plain text M.

In the following, as an example of the "ID-Based Signature Scheme", there will be explained a system proposed by A. Fiat and A. Shamir, "How to Prove Yourself: Practical Solution to Identification and Signature Problems", Proc. Of Crypt. '86, 1986.

System Preparation

The center selects prime numbers p and q, and publicizes the product N thereof and a one-directional function f for converting an arbitrary character train into [0, N).

An entity A receives a secrecy $s_{Aj}$ for its identifier $I_A$ from the center. The center confirms the correctness of $I_A$ of the entity, then determines:

$$ID_{Aj}=f(I_A, j)$$

where j is a small parameter, then calculates:

$$s_{Aj}=1/\sqrt{I} \ D_{Aj} \bmod N$$

and transfers it to the entity A (for the purpose of simplicity, representation is made as j=1, 2, 3, . . . k).

Generation of Signature

The entity A signs the plain text M.

In a step 1, the entity A generates random numbers:

$$\gamma_1, \ldots \gamma_t \in [0, N)$$

and calculates:

$$x_i = y_i^2 \bmod N$$

Then, in a step 2, the entity A calculates:

$$f(M, x_1, \ldots, x_t)$$

and takes the initial kt bits as the value of $e_{ij}$, where:

$$(1 \leq i \leq t, 1 \leq j \leq k)$$

In a next step 3, the entity A calculates:

$$y_i = r_i \prod_{e_{ij}=1} s_{Aj} \bmod N \quad (i=1, \ldots, t)$$

and takes $I_A$, M, $e_{ij}$ and $y_i$ as the digital signature.

Verification of Signature

An entity B, receiving $I_A$, M, $e_{ij}$ and $y_i$, calculates:

$$ID_{Aj}=f(I_A, j) \quad (1 \leq j \leq k),$$

$$z_i = y_i^2 \prod_{e_{ij}=1} ID_{Aj} \bmod N \quad (1 \leq i \leq t)$$

and confirms that the initial kt bits of $f(M, z_1, \ldots, z_t)$ coincide with $e_{ij}$.

In the following, there will be explained, as an example of the ID-based shared key (key delivery) system, a system proposed by E. Okamoto, "ID-Based Key Delivery System", ISEC88-6, 1988.

Preparation

The center generates a modulus n, a public key e and a secret key d. The center is assumed to be reliable and d is maintained as the secret of the center.

Entry of User

The center transfers ($ID_x$, $s_x$, n, e, g) to a user X, wherein g is a constant, and sx is represented by:

$$s_x = ID_x^{-d} \bmod n$$

Generation of Work Key

In the following it is assumed that a key is generated between entities A and B. In a step 1, the entity A generates a random number $r_A$ and sends:

$$x_A = S_A \cdot g^{r_A} \bmod n$$

to the entity B, which similarly generates a random number $r_B$ and provides the entity A with:

$$x = S_B \cdot g^{BE} \bmod n$$

In a step 2, the entity A obtains:

$$WK_{AB} = (ID_B \cdot x^e{}_B)^{r_A} = g^{e \cdot r_A \cdot r_B} \bmod n$$

while the entity B obtains:

$$WK_{AB} = (ID_A \cdot x^e{}_A)^{r_B} = g^{e \cdot r_A \cdot r_B} \bmod n$$

In the following, as an example of the ID-based identification confirmation system, there will be explained the foregoing system proposed by A. Fiat and A. Shamir, "How to Prove Yourself: Practical Solution to Identification and Signature Problems", Proc. Of Crypt. '86, 1986.

System Preparation

This is the same as that described in connection with ID-based signature scheme.

Confirmation of Identity

An entity A proves that it is truly A, to another entity B.

In a step 1, the entity A sends $I_A$ to the other entity B.

Then, in a step 2, the other entity B calculates $f(I_A, j)$ (j=1, 2, ..., k).

Then, following steps 3 to 6 are repeated from i=1 to i=t.

In the step 3, the entity A generates a random number $r_1$ ∈[0, n) and sends $x_i = r_i^2 \bmod n$ to the other entity B.

In the step 4, the other entity B sends a random binary vector ($e_{i1}, \ldots, e_{ik}$) to the entity A.

In the step 5, the entity A sends, to the other entity B:

$$y_i = r_i \prod_{e_{ij}=1} s_{Aj} \bmod N \quad (i = 1, \ldots, t)$$

In the step 6, the other entity B confirms:

$$x_i \stackrel{?}{=} y_i^2 \prod_{e_{ij}=1} ID_{Aj} \bmod N$$

However, pretense may not be completely preventable even if the ID is taken as the public key. For example, in a case of effect communication by exchanging the ID with a business partner, there can be considered a case where the given ID is not of such business partner itself but of another similar person or of an entirely different person.

Stated differently, even in the ID-based cipher systems and signature schemes, though the public key has an understandable meaning, the adequacy of the given ID cannot be securely identified from the ID alone. Consequently the proper correspondence between the entity providing the public key (ID) and the provided public key (ID) is still not guaranteed, as in other public key systems.

SUMMARY OF THE INVENTION

An object of the present invention is to resolve the above-mentioned drawbacks.

Another object of the present invention is to provide an encrypting method, a deciphering method and a certifying method allowing secure confirmation of the correspondence between the entity itself and its public key, thereby preventing so-called pretense.

The foregoing objects can be attained, according to the present invention, by an encrypting method which is featured by the encrypting employing information correlated with an attribute of the entity as a key. In a preferred embodiment, the above-mentioned attribute is the biophysical attribute information of the entity.

Also according to the present invention, there is provided a certifying method which is featured by judging the adequacy of the correspondence between the key and the entity, based on the result of comparison of the attribute information of the entity and the information provided as the key of the entity.

Still other objects of the present invention, and the features thereof, will become fully apparent from the following detailed description of the embodiments, to be taken in conjunction with the attached drawings.

DETAILED DESCRIPTION OF THE PREFERRED EMBODIMENTS

Now the present invention will be clarified in detail by embodiments thereof, with reference to the attached drawings.

Figure 1:
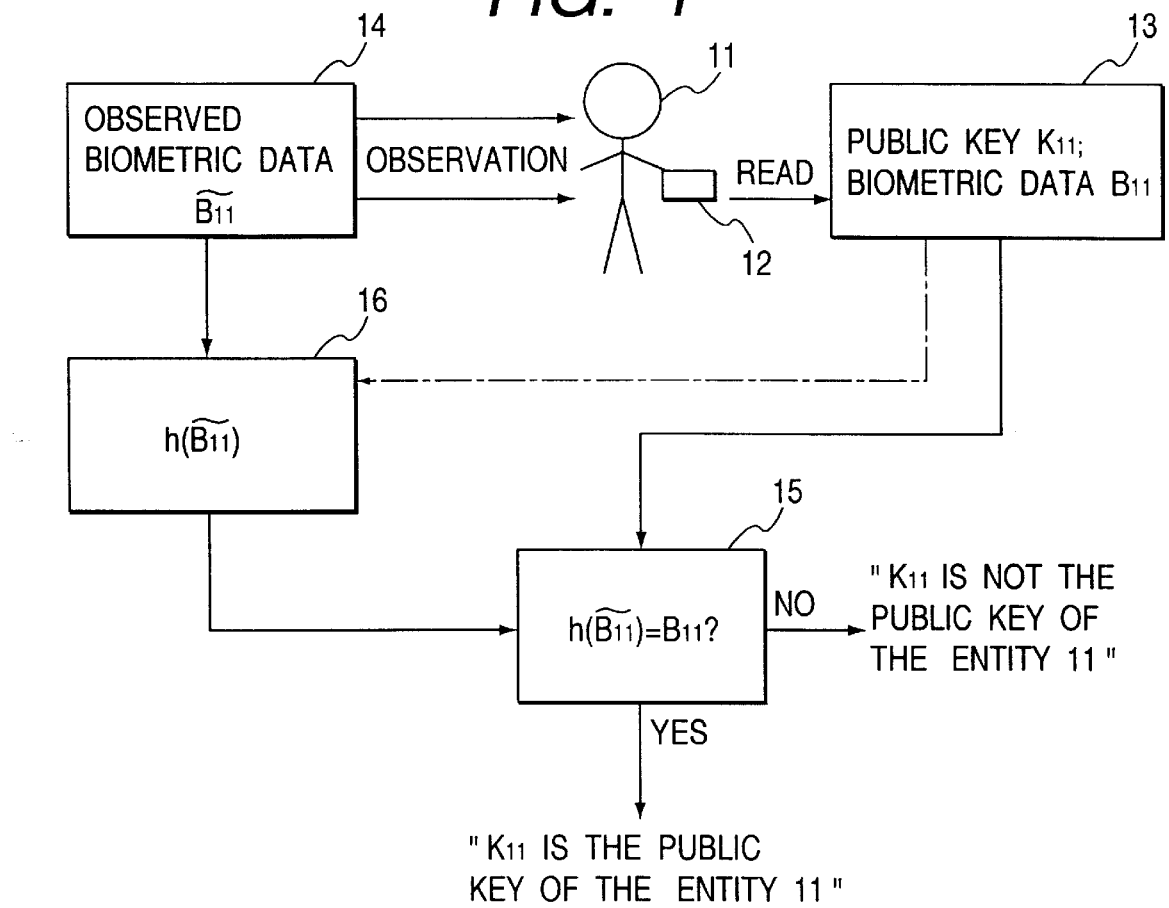
FIG. 1 is a schematic view showing the concept of an embodiment of the present invention.

At first an embodiment will be explained with reference to a concept view shown in FIG. 1. In FIG. 1, there are shown an entity 11 that can be a user or a terminal device of various types, and a recording medium 12 (hereinafter called data carrier) such as an IC card, held by the entity 11.

The present embodiment employs attribute information $B_{11}$ specific to the entity 11 as the public key $K_{11}$ to be employed in one or plurality of the ID-based encrypting system, ID-based signature system, ID-based shared key system and ID-based identification system explained in the foregoing, and the center of the system records the above-mentioned attribute information $B_{11}$ in the data carrier 12 after the confirmation of the correspondence between the attribute information $B_{11}$ and the entity 11. In case the entity 11 is a user (person), the attribute information mentioned above can be the information on the biophysical (biomedical) features of such entity (user).

Consequently, in verifying the public key $K_{11}$ of the entity 11, the verifier reads the public key $K_{11}$, namely the attribute information $B_{11}$ of the entity 11, from the data carrier 12 provided by the entity 11 by means of a reader 13, then observes the attribute information of the entity 11 by an observing device 14 and compares thus obtained information, thereby confirming that the entity 11 is the proper (true) owner of the carrier 12 or that the biophysical attribute information recorded on the data carrier 12 is the public key of the entity 11 and being allowed to proceed to various subsequent operations.

The result $\tilde{B}_{11}$ of the above-mentioned observation is compressed in conversion means 16 with a one-directional function such as Hash function to obtain a converted value $h(\tilde{B}_{11})$, and it is verified 15 whether the value $h(\tilde{B}_{11})$ is equal to the attribute information $B_{11}$ of the entity 11, read from the data carrier 12.

In this case, the above-mentioned attribute information $B_{11}$ is obtained by a conversion process similar to that in the converting means 16. In such case, data indicating the processing method (for example data indicating the kind of the function) are recorded in the data carrier 12 and are communicated to the converter 16.

By constituting the attribute information $B_{11}$ with the data obtained by compressing the biophysical feature of a person, the data of a large data amount, such as the data of the face of the person, can also be stored in the carrier 12 such as an IC card. Also, the comparison of such compressed data allows one to reduce the time required therefor.

In the above-explained embodiment, the attribute information $B_{11}$ itself is employed as the public key $K_{11}$, but such public key $K_{11}$ may improperly or inadvertently become too widely known, as by secret observation of the attribute information. In such case, the public key $K_{11}$ may be obtained by applying a process of a predetermined algorithm to the attribute information $B_{11}$.

In such case, the public key $K_{11}$ cannot be obtained from the attribute information $B_{11}$ as long as the above-mentioned algorithm remains secret, so that the secret nature of the public key $K_{11}$ can be satisfactorily maintained.

Figure 2:
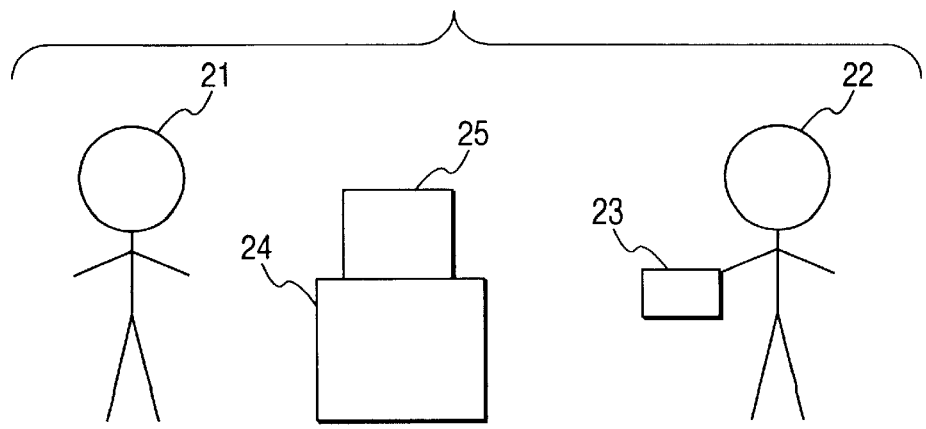
FIG. 2 is a schematic view showing an embodiment in which the concept shown in FIG. 1 is applied to the confirmation of identity.

In the following there will be explained, with reference to FIG. 2, a more specific embodiment utilizing the above-explained concept for the personal identification. In FIG. 2 there are shown a first entity 21, a second entity 22, a data carrier 23 storing the public key provided by the second entity 22, a computer 24, and a display 25.

The data carrier 23, provided as the public key by the second entity 22, is a recording medium such as a magnetic card, an IC card, a floppy disk or a CD-ROM. It is assumed, in the present embodiment, that the biophysical attribute information of the entity is the face (or photographic data thereof) of the entity and that the data carrier 23 is a floppy disk.

System Preparation

The center (not shown) selects prime numbers p, q, and publicizes the product N thereof, a one-directional function f for converting an arbitrary character train into [0, N) and a program for displaying the photographic data of the face.

The entity A, joining the system, receives secret $S_{Aj}$ corresponding to such facial photographic data from the center in the following manner.

The center confirms that the above-mentioned entity A and the facial photographic data $I_A$ have a proper correspondence, then determines:

$$ID_{Aj}=f(I_A,j)$$

wherein j is a small parameter, and calculates:

$$s_{Aj}=1/\sqrt{ID_{Aj}} \bmod N$$

(for the purpose of simplicity representation is made as j=1, . . . , k).

Then the above-mentioned secret $s_{Aj}$ is transferred to the entity A by any method that is available only to the entity A (for example by storage in an IC card of which the secret code number is only known to the entity A). The entity A retains the facial photographic data $I_A$ stored in its data carrier.

Confirmation of Public Key

In the following there will be explained the procedure, to be executed by the entity 21, for confirming the identity of the second entity 22 that has undergone a procedure similar to the above-explained one for the entity A.

The first entity 21 receives the data carrier 23 from the second entity 22, and confirms that the public key provided therein properly corresponds to the second entity 22 itself in the following manner.

The first entity 21 read the public key (facial photographic data) $I_A$ by a floppy disk drive connected to the computer 24, and displays such data on the display 25 by the facial photographic data displaying program. Then the first entity itself visually compares such display with the face of the second entity 22. In this manner the first entity 21 itself can securely judge whether the second entity 22 properly corresponds to the public key (facial photographic data) provided thereby.

Confirmation of Identity

In an embodiment in which the concept of the present embodiment is applied to the identity confirming method explained above, the ID is the biophysical attribute information of the entity, and any physical attribute information enabling direct on-site confirmation by human observation can be employed as the public key.

In addition to the facial photograph, there may be employed, for example, the handwriting, fingerprint, palm print or voice print, which can be directly confirmed by persons, utilizing an image displaying program or a voice reproducing program on the computer 24, and such data are recorded as the public key in the data carrier 23.

Also such principle is applicable not only to the ID-based identification system but naturally also to the ID-based enciphering system, the ID-based signature system, or the ID-based shared key system, or plurality thereof.

In the following there will be explained, with reference to FIG. 3, another embodiment in which the concept of the present invention is applied to an encrypting system. This embodiment employs an input device instead of the human eye.

Figure 3:
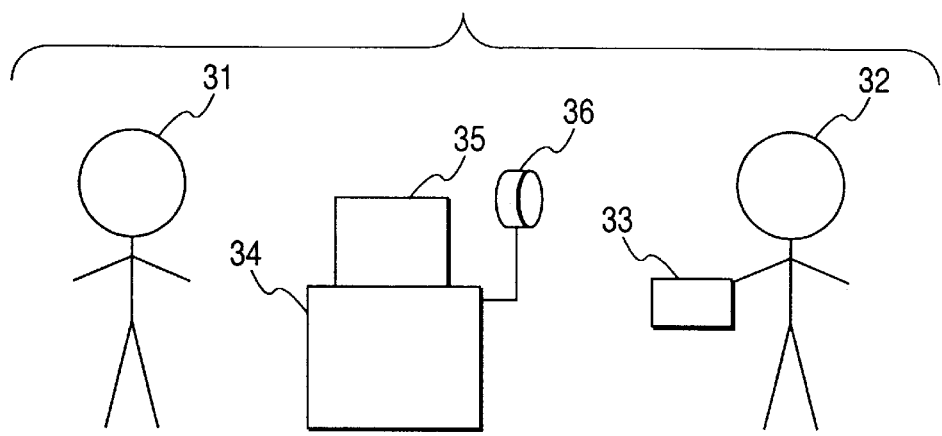
FIG. 3 is a schematic view showing an embodiment in which the concept shown in FIG. 1 is applied to the enciphering.

In FIG. 3, there are shown a first entity 31, a second entity 32, a data carrier 33 recording the public key provided by the second entity 32, a computer 34, a display 35 and an input device 36.

The present embodiment employs the fingerprint and an IC card instead of the facial photograph and the floppy disk in the foregoing embodiment.

System Preparation

In a step 1, the center publicizes n-dimensional vectors:

$$a=(a_1, a_2, \ldots, a_n)$$
$$h=(h_1, h_2, \ldots, h_n)$$
$$h_1=g^{a_1} \mod p (1 \leq 1 \leq n)$$

defined by a prime number p, an original element g of a Galois field GF(p) and a Galois field GF(p), also a one-directional function f and a fingerprint comparing program.

In a step 2, an entity i, joining the system, registers its fingerprint data:

$$ID_i=(x_{i1}, x_{i2}, \ldots, x_{ik})$$

wherein:

$$(k<n), x_{i1} \in \{0, 1\} (i \leq 1 \leq k)$$

at the center.

Then, in a step 3, the center confirms the correspondence between the entity i and its fingerprint data $ID_i$, then determines:

$$EID_i \triangleq f(ID_i)=(y_{i1}, y_{i2}, \ldots, y_{in}) \qquad (2)$$

$$y_{i1} \in \{0, 1\} (i \leq 1 \leq n)$$

also calculates the secret key $S_i$ of the entity i:

$$S_i \equiv \sum_{1 \leq j \leq n} a_j y_{ij} \mod p$$
$$\equiv EID_i \cdot a \mod p$$

and sends it to the entity i through a safe communication path.

In a step 4, the entity i stores the fingerprint data $ID_i$, in its data carrier.

Confirmation of Public Key

Now there will be explained the case of cipher communication by the first entity 31, with the second entity 32 that has undergone a process similar to the above-explained one for the entity i.

The first entity 31 receives the data carrier (ID card) 33 and confirms that the public key provided therein properly corresponds to the second entity 32 itself, in the following manner.

The first entity 31 reads the public key (fingerprint in this case) from the data carrier 33, utilizing an IC card reader connected to the computer 34. At the same time, the fingerprint of the second entity 32 is scanned by the input device 36 (for example a surface irregularity detector) connected to the computer 34, and thus scanned fingerprint of the second entity 32 is compared with the fingerprint data read as the public key by the fingerprint comparing program of the computer 34. Such procedure allows to judge whether the second entity 32 properly corresponds to the public key (fingerprint data) provided by the second entity 32.

Cipher Communication

The first entity 31 executes the cipher communication with the second entity 32, by a procedure similar to that for the entity j in the ID-based enciphering system explained in the foregoing.

In the present embodiment, the biophysical attribute information of the entity constitutes the public key, and any attribute information allowing confirmation of the entity itself through the use of any device can be utilized as the public key.

In addition to the fingerprint explained above, there may be employed, for example, the palm print, handwriting, voice print, iris pattern or retina pattern may be selected as the public key. Such palm print, handwriting, voice print, iris pattern or retina pattern can be directly confirmed by an input device, such as a surface irregularity sensor, a pen tablet, a microphone or a camera, connected to the computer 34, and the data carrier 33 stores the data, obtained with such input device and suitably converted if necessary, as the public key. In case of rewriting the above-mentioned attribute information, there is preferably employed a security measure such as entry of a password representing the entity itself.

Also, such principle is applicable not only to the ID-based enciphering system but naturally also to the ID-based signature system, the ID-based shared key system or the ID-based identification system, or plurality thereof.

In any of the foregoing embodiments, if the biophysical attribute information has a large data amount, the public key may be obtained by reducing the data amount of such information by a known compression function indicated as h( ) in FIG. 1 (for example a one-directional function for projecting the input into a smaller random size).

Figure 4:
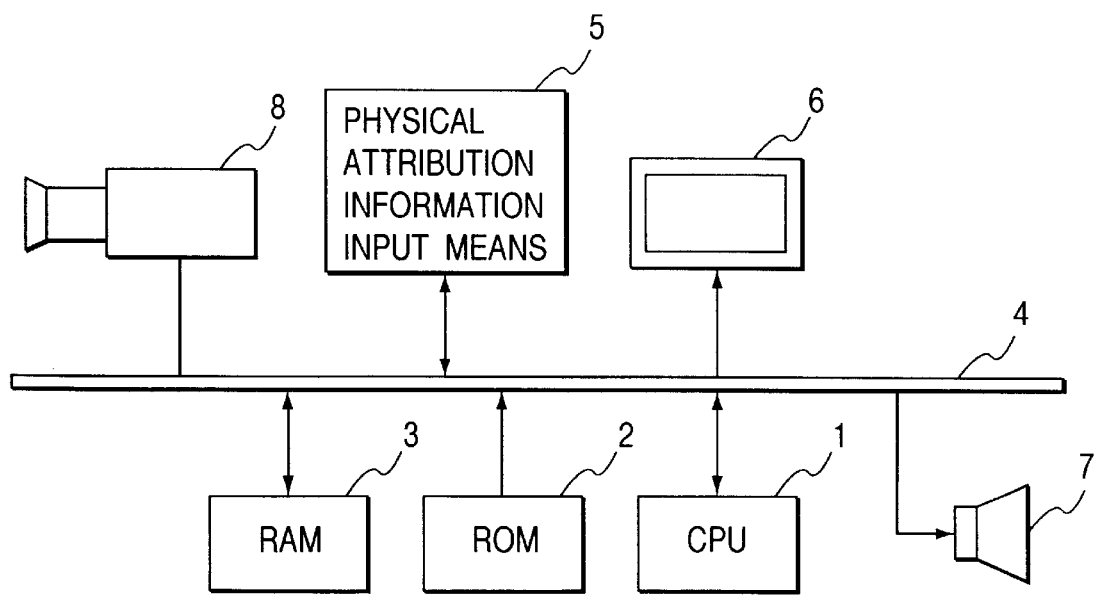
FIG. 4 is a view showing a hardware configuration of an enciphering apparatus utilizing the concept of the present invention.

FIG. 4 shows an example of the hardware configuration in which the concept of the present invention is applied to an encrypting apparatus or the like.

As shown in FIG. 4, the apparatus is composed of a microcomputer consisting of a CPU 1, a ROM 2 and a RAM 3 connected by a data bus 4.

There are also provided biophysical attribute information input means 5 such as an IC card reader or a scanner for entering the biophysical attribute information, display means 6 for displaying various information on an image display area, sound generation means 7 for generating various sound information, and a camera 8 for observing the entity.

The ROM 2 is used for storing various programs constituting function means of the above-mentioned units, while the RAM 3 is used for temporarily storing various data and as the work memory of the CPU 1.

The CPU 1 mechanically, optically or magnetically detects and recognizes the medium, such as an IC card, storing such attribute information, detects the attribute information by the biophysical attribute input means 5, also observes the entity by the camera 8 and executes a process of conversion and/or comparison according to the programs or algorithms stored in the ROM 2.

The camera 8 is adapted to normalize the phototaken data so as to obtain a predetermined size within the imaging angle, and the above-mentioned algorithm of comparison is adapted to absorb the fluctuation in size within a predetermined range, in the data obtained from the camera 8.

In such configuration, the microcomputer consisting of the CPU 1, ROM 2, RAM 3 and data bus 4 constitutes conversion means (converter) for compressing the biophysical attribute information of the entity, observation means (observing device) for observing the biophysical attribute information of the entity, comparison means (reader) for comparison with the key information provided as the key of the entity, judgment means (comparator) for judging the adequacy of the correspondence between the biophysical attribute information of the entity and the key information, and verification means for verifying whether the key information read from the medium storing the key information is equal to the observed biophysical attribute information of the entity, thereby providing an encrypting apparatus, a signing apparatus, a key sharing apparatus or an identity confirming apparatus utilizing the concept of the present invention.

Also in the present embodiment, in a case where the attribute information read from the carrier does not coincide with the data through the camera 8, such situation may be displayed on the display means 6, and, in consideration of the possibility of an improper use, the entity photographed by the camera 8 and the time of operation may be stored in the memory 3 or may be transmitted as a warning to another location through an unrepresented network. In this manner the system can prevent trouble and can assist the investigation of a crime.

As explained in the foregoing, the present invention, utilizing the attribute information specific to the entity or the information obtained by suitable compression and/or conversion as the key or a key corresponding to such information, enables direct confirmation of the correspondence between the entity and the key through the physical attribute information mentioned above. Thus the present invention enables secure communication with the true entity person and can securely prevent pretense by any other person. Also, even between the entities in mutual distant locations, the correspondence between the unseen entity and his public key can be confirmed as long as the communication line between the entities and the devices thereof are reliable.

Many widely different embodiments of the present invention may be constructed without departing from the spirit and scope of the present invention. It should be understood that the present invention is not limited to the specific embodiments described in the specification, except as defined in the appended claims.

What is claimed is:

1. An encrypting method comprising:
    a first step, of inputting as a key, predetermined information associated with attribute information of an entity;
    a second step, of inputting the attribute information of the entity;
    a third step, of normalizing the attribute information input in said second step to be subject to a comparison processing;
    a fourth step, of comparing the attribute information normalized in said third step and attribute information obtained based on the key input in said first step; and
    a fifth step, of, when said fourth step results in the attribute information provided in said third step being identical with the attribute information obtained based on the input key, encrypting information to be communicated by using the key.

2. A method according to claim 1, wherein said attribute information of the entity is information indicating a physical feature of said entity.

3. A method according to claim 1, wherein said predetermined information is information obtained by applying a predetermined process to said attribute information, thereby reducing an information amount thereof.

4. A method according to claim 3, wherein said predetermined process employs a one-directional function.

5. A method according to claim 3, wherein said predetermined information and information indicating said predetermined process are recorded in a single recording medium.

6. A method according to claim 1, wherein said predetermined information is used as a public key in a public key cipher system.

7. A method according to claim 6, wherein said predetermined information is recorded in a portable recording medium and is obtained by reading said medium.

8. A method according to claim 6, wherein said entity is an entity at a destination of communication, and the attribute of said entity corresponding to said predetermined information is separately observed and the information obtained by said observation is compared with said predetermined information.

9. A method according to claim 5, wherein said predetermined information and information indicating said predetermined process are recorded in a single recording medium, and information obtained by processing the information, obtained by observation, according to the information indicating said predetermined process is compared with said predetermined information.

10. A method according to claim 1, wherein said predetermined information is used as a secret key in a public key cipher system.

11. A method according to claim 10, wherein said entity is an enciphering entity, and is adapted to operate with a secret key obtained by applying a predetermined process to said attribute information and a public key corresponding to said secret key.

12. A method according to claim 10, wherein information corresponding to a public key is recorded in a portable recording medium.

13. A decoding method comprising:
    a first step, of inputting as a key, predetermined information associated with attribute information of an entity;
    a second step, of inputting the attribute information of the entity;
    a third step, of normalizing the attribute information input in said second step to be subjected to a comparison processing;
    a fourth step, of comparing the attribute information normalized in said third step and attribute information obtained on the key input in said first step; and
    a fifth step, of, when said fourth step results in the attribute information provided in said third step being identical with the attribute information obtained based on the input key, decoding encrypted information by using the key.

14. A method according to claim 13, wherein said attribute information of the entity is information indicating a physical feature of said entity.

15. A method according to claim 13, wherein said predetermined information is information obtained by applying a predetermined process to said attribute information, thereby reducing an information amount thereof.

16. A method according to claim 15, wherein said predetermined process employs a one-directional function.

17. A method according to claim 16, wherein said predetermined information and information indicating said predetermined process are recorded in a single recording medium.

18. A method according to claim 13, wherein said predetermined information is used as a public key in a public key cipher system.

19. A method according to claim 18, wherein said predetermined information is recorded in a portable recording medium and is obtained by reading said medium.

20. A method according to claim 19, wherein said entity is an entity at a source of communication, and the attribute of said entity corresponding to said predetermined information is separately observed and the information obtained by said observation is compared with said predetermined information.

21. A method according to claim 15, wherein said predetermined information and information indicating said predetermined process are recorded in a single recording medium, and information obtained by processing the information, obtained by observation, according to the information indicating said predetermined process is compared with said predetermined information.

22. A method according to claim 13, wherein said predetermined information is used as a secret key in a public key cipher system.

23. A method according to claim 22, wherein said entity is a deciphering entity, and is adapted to operate with a secret key obtained by applying predetermined process to said attribute information and a public key corresponding to said secret key.

24. A method according to claim 23, wherein the information corresponding to said public key is recorded in advance in a portable recording medium.

25. A certifying method for judging correspondence between information of an entity by comparing predetermined information, correlated with attribute information of said entity, with attribute information of the entity obtained by separately observing the attribute of said entity, wherein the separately observed attribute information is normalized prior to the comparison.

26. A method according to claim 25, wherein said predetermined information is used as a public key in deciphering in a public key cipher system, and said entity is the entity at a source of communication.

27. A method according to claim 25, wherein said predetermined information is used as a public key in enciphering in a public key cipher system, and said entity is the entity at a destination of communication.

28. A computer-readable storage medium for storing a program for executing an encrypting method, said encrypting method comprising:

a first step, of inputting as a key, predetermined information associated with attribute information of an entity;

a second step, of inputting the attribute information of the entity;

a third step, of normalizing the attribute information input in said second step to be subject to a comparison processing;

a fourth step, of comparing the attribute information normalized in said third step and attribute information obtained based on the key input in said first step; and a fifth step, of, when said fourth step results in attribute information provided in said third step being identical with the attribute information obtained based on the input key, encrypting information to be communicated by using the key.

* * * * *

UNITED STATES PATENT AND TRADEMARK OFFICE
CERTIFICATE OF CORRECTION

PATENT NO.   : 6,385,318 B1                                            Page 1 of 1
DATED        : May 7, 2002
INVENTOR(S)  : Oishi It is certified that error appears in the above-identified patent and that said Letters Patent is hereby corrected as shown below:

<u>Title page,</u>
Item [56], References Cited, FOREIGN PATENT DOCUMENTS,
"EP     334616 A      9/1989" should read -- EP     334616 A2     9/1989 --; and
"WO    9608093 A      3/1996" should read -- WO    9608093 A1    3/1996 --.

<u>Column 1,</u>
Line 39, "public key)" should read -- "public key") --.

<u>Column 14,</u>
Line 46, "claim 13," should read -- claim 14, --.

Signed and Sealed this

Twenty-seventh Day of May, 2003

JAMES E. ROGAN
*Director of the United States Patent and Trademark Office*